(12) United States Patent
Lahr et al.

(10) Patent No.: US 9,726,486 B1
(45) Date of Patent: Aug. 8, 2017

(54) SYSTEM AND METHOD FOR MERGING ENHANCED VISION DATA WITH A SYNTHETIC VISION DATA

(75) Inventors: Weston J. Lahr, Sherwood, OR (US); Peter H. Bold, Portland, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 253 days.

(21) Appl. No.: 13/194,594

(22) Filed: Jul. 29, 2011

(51) Int. Cl.
  *H04N 7/18* (2006.01)
  *G01C 11/00* (2006.01)
  *G06T 7/00* (2017.01)
  *G01B 11/02* (2006.01)

(52) U.S. Cl.
  CPC ............. *G01C 11/00* (2013.01); *G06T 7/00* (2013.01); *G01B 11/022* (2013.01)

(58) Field of Classification Search
  USPC .......................................................... 348/135
  See application file for complete search history.

(56) References Cited

U.S. PATENT DOCUMENTS

| | | | | |
|---|---|---|---|---|
| 6,094,508 | A * | 7/2000 | Acharya et al. | 382/199 |
| 7,304,672 | B2 * | 12/2007 | Sai et al. | 348/252 |
| 7,307,549 | B2 * | 12/2007 | Firra | 340/974 |
| 7,522,314 | B2 * | 4/2009 | Atkins | 358/3.27 |
| 7,605,719 | B1 * | 10/2009 | Wenger et al. | 340/974 |
| 7,605,774 | B1 * | 10/2009 | Brandt et al. | 345/7 |
| 7,609,200 | B1 * | 10/2009 | Woodell et al. | 342/176 |
| 7,675,461 | B1 * | 3/2010 | McCusker et al. | 342/179 |
| 7,747,364 | B2 * | 6/2010 | Roy et al. | 701/28 |
| 7,826,666 | B2 * | 11/2010 | Hamza et al. | 382/218 |
| 2005/0099433 | A1 * | 5/2005 | Berson et al. | 345/619 |
| 2006/0033754 | A1 * | 2/2006 | Evans | 345/629 |
| 2006/0227012 | A1 * | 10/2006 | He | 340/945 |
| 2007/0005199 | A1 * | 1/2007 | He | 701/16 |
| 2007/0297696 | A1 * | 12/2007 | Hamza et al. | 382/294 |
| 2008/0060034 | A1 * | 3/2008 | Egnal | G01C 11/02 725/105 |
| 2008/0180351 | A1 * | 7/2008 | He | 345/1.1 |
| 2008/0240498 | A1 * | 10/2008 | Hamza | 382/103 |
| 2008/0243383 | A1 * | 10/2008 | Lin | 701/213 |
| 2009/0214079 | A1 * | 8/2009 | Hamza et al. | 382/103 |
| 2010/0292886 | A1 * | 11/2010 | Szczerba et al. | 701/29 |
| 2011/0085735 | A1 * | 4/2011 | Malik | 382/199 |
| 2011/0227944 | A1 * | 9/2011 | Feyereisen et al. | 345/632 |
| 2014/0077988 | A1 * | 3/2014 | Saito | 342/27 |

\* cited by examiner

*Primary Examiner* — Christopher S Kelley
*Assistant Examiner* — Ana Picon-Feliciano
(74) *Attorney, Agent, or Firm* — Donna P. Suchy; Daniel M. Barbieri

(57) ABSTRACT

A system and method for providing a video merged from two independent video sources to a display is disclosed. The system and method includes receiving an enhanced vision video from an enhanced vision system, receiving a synthetic vision video from a synthetic vision system and selecting an enhanced frame in the enhanced vision video. The system and method also includes selecting a synthetic frame from the synthetic vision video corresponding to the selected enhanced frame, analyzing the enhanced frame to detect objects according to a first algorithm, analyzing the synthetic frame to detect default frame segments, merging the enhanced frame and the synthetic frame to provide a merged frame that includes detected objects and detected default frame segments and displaying the merged frame on a display.

20 Claims, 7 Drawing Sheets

SYSTEM AND METHOD FOR MERGING ENHANCED VISION DATA WITH A SYNTHETIC VISION DATA

BACKGROUND

Various embodiments disclosed herein relate to merging video content from multiple video sources in order to create merged video content for display.

Integrating valuable segments of data from multiple video sources and merging those valuable segments into a single video has benefits in a wide variety of applications including but not limited to medical imaging, land based vehicle systems, aircraft systems, systems using head-up display (HUD) and wearable displays, such as, helmet mounted displays (HMD). In aircraft applications, HUD and HMD systems are advantageous in that they allow the flight crew to maintain eye contact with the outside environment while simultaneously viewing information from aircraft systems and sensors in a graphical and alphanumeric format overlaying the outside world view. Head-up display systems are known to provide conformal information such that displayed features overlay the environmental view or display information from a camera or other imaging sensor (such as a visible light imaging sensor, infrared imaging sensor, millimeter wave radar imager, etc.) mounted on the aircraft.

In modern avionics systems, display content from video sources can be collected from Synthetic Vision Systems ("SVS") and Enhanced Vision Systems ("EVS") for displaying terrain and other environmental information to HUD, HMD and HDD systems. The SVS and EVS systems are advantageous because they each present unique perspectives of terrain and environmental information of the scene in front of the aircraft to the pilot. In current avionics systems, pilots must switch between either displaying SVS video content or EVS video content depending on a desired perspective.

Synthetic vision systems (SVS) can include any type of computer generated imagery that is displayed to a user. With respect to avionics, SVS is defined by the Federal Aviation Administration (FAA) as a computer generated image of the external scene topography that is derived from aircraft attitude, high-precision navigation solution, and database of terrain, obstacles, runways and other relevant features. Synthetic Vision relies on information contained in an on-board aircraft database. Therefore, only those terrain, obstacle, and runway features which are contained in the current version of an SVS database will be displayed in an SVS video. Because SVS video can display surrounding terrain to a user regardless of weather conditions, SVS is useful in the perception of the aircraft's approach progress and awareness of terrain constraints.

Enhanced vision systems use imaging sensors to capture video, for example, to capture real world topography or other images captured by sensors. In many cases, the video is enhanced by infrared sensing. Enhanced vision video provides actual real time images of the surrounding terrain and obstacles. For example, in avionics, enhanced vision video is advantageous in that it allows a pilot to view objects such as a person, vehicle or aircraft crossing a runway during a landing procedure. However, in many instances, the usability of the EVS image is directly dependent on external environmental conditions. For example, in low visibility conditions such as fog or rain, the EVS data is obscured and the pilot must switch to the SVS to receive terrain information. The embodiments disclosed herein provide for the simultaneous display of video content information from an SVS and video content from an EVS.

SUMMARY

One exemplary embodiment relates to a method for providing merged video content from two independent video sources. The method includes receiving an enhanced vision video from an enhanced vision system, receiving a synthetic vision video from a synthetic vision system, selecting an enhanced frame in the enhanced vision video and selecting a synthetic frame from the synthetic vision video corresponding to the selected enhanced frame. The method further includes analyzing the enhanced frame to detect objects according to a first algorithm, analyzing the synthetic frame to detect default frame segments, merging the enhanced frame and the synthetic frame to provide a merged frame that includes detected objects and detected default frame segments and displaying the merged frame on a display.

Another exemplary embodiment relates to an apparatus for providing merged video content from two independent video sources including an enhanced vision system including at least a first sensor configured to detect enhanced vision video and a synthetic vision system including a graphics generator configured to generate a computer generated synthetic vision video. At least one processing device configured to receive enhanced vision video from the enhanced vision system and synthetic vision video from the synthetic vision system, select an enhanced frame in the enhanced vision video, select a synthetic frame from the synthetic vision video corresponding to the selected enhanced frame, detect the presence of objects in the enhanced frame, detect the presence of default frame segments in the synthetic frame and merge the enhanced frame with the synthetic frame to provide a merged frame that includes objects detected in the enhanced frame and default frame segments detected in the synthetic frame.

Yet another embodiment relates to an apparatus for providing a video merged from an enhanced vision system including at least a first forward looking sensor mounted externally to an aircraft configured to detect enhanced vision video and a synthetic vision system including a graphics generator configured to generate a computer generated synthetic vision video. The apparatus includes a processing device configured to receive enhanced vision video from the enhanced vision system and synthetic vision video from the synthetic vision system, select an enhanced frame in the enhanced vision video and select a synthetic frame from the synthetic vision video corresponding to the selected enhanced frame. The processor is also configured to detect the presence of objects in the enhanced frame, detect the presence of default frame segments in the synthetic frame and merge the enhanced frame with the synthetic frame to provide a merged frame that includes objects detected in the enhanced frame and default frame segments detected in the synthetic frame.

BRIEF DESCRIPTION OF THE DRAWINGS

Exemplary embodiments are hereinafter described, wherein like reference numerals refer to like elements, in which.

DETAILED DESCRIPTION OF PREFERRED AND EXEMPLARY EMBODIMENTS

Figure 1:
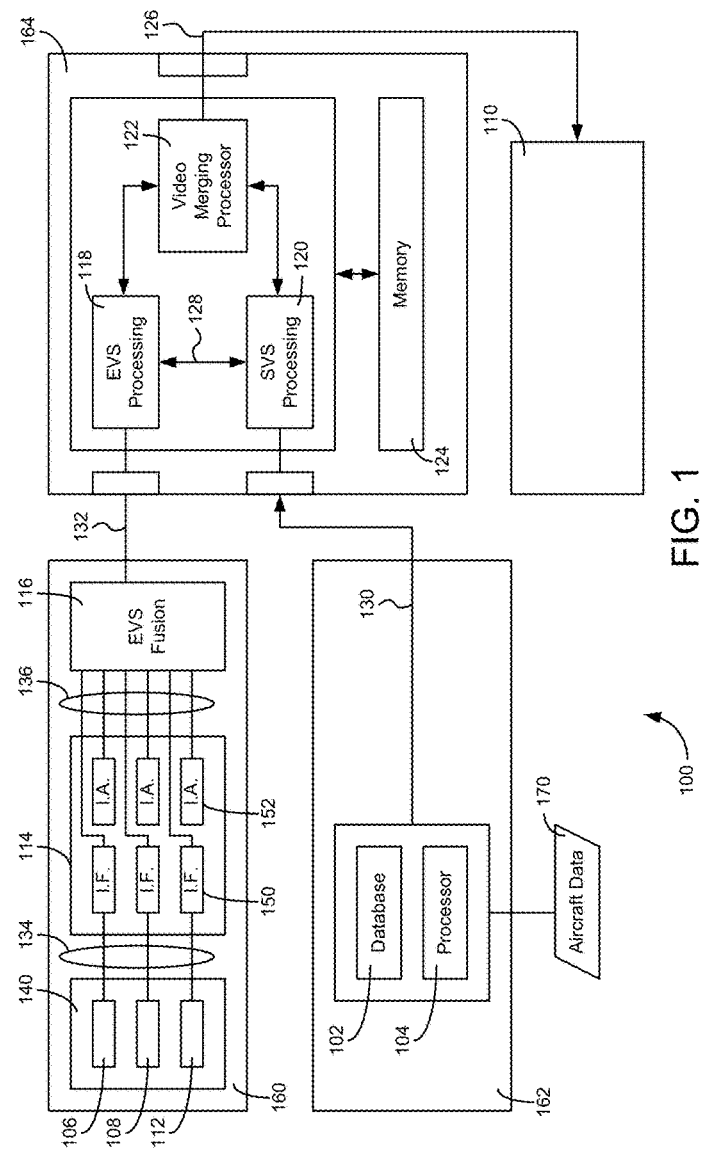
FIG. 1 is a block diagram of one exemplary embodiment of a system for providing merged EVS and SVS data.

Before describing in detail the particular improved system and method, it should be observed that the several disclosed embodiments include, but are not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the disclosed embodiments are not limited to the particular embodiments depicted in the exemplary diagrams, but should be construed in accordance with the language in the claims.

Referring to FIG. 1, one exemplary embodiment of a video merging system 100 is depicted. System 100 is suitable for implementation in a wide variety of applications that include at least two independent sources of video content and a display. For example, system 100 may be implemented in applications including but not limited to medical imaging, land based vehicle systems, aircraft systems, or systems using HUD, HDD and wearable displays, such as, helmet mounted displays (HMD). Video merging system 100 may include of EVS 160 and SVS 162. In one embodiment, video merging element 164 accepts a video signal input 132 from the EVS 160 and a video signal input 130 from SVS 162. Video merging element 164 analyzes portions of video signals 130 and 132 at processors 118 and 120 and merges the analyzed video signals at processor 122, according to an algorithm stored in memory 124 according to one embodiment. The merged video signal 126 is then sent to a display unit 110 for display to a user such as an airplane pilot. At any one time, merged video signal 126 may contain only video content from signal 130, only video content from signal 132 or a combination of signals 130 and 132.

It should be noted that, although the video merging element 164 is depicted in FIG. 1 as a composition of three separate processing units 118, 120 and 122, any of the processors depicted herein or any processor used by other aircraft systems may perform the same processing functions of video merging element 164, either in whole or in part. The adaptability of processors for use in other functions or systems, and the ease of which such adaptation may occur, is well-known to those skilled in the art. Accordingly, the discussion of the video merging element 164 or processing units 118, 120 and 122 herein should not be read as a limitation or narrowly construed as to exclude the use of any processor used by other aircraft systems to accomplish the same or equivalent functions.

According to one embodiment, video merging system 100 can be provided as part of or integrated with EVS 160 or SVS 162. One or more processors within EVS 160 and SVS 162 may be used to effect operations of system 100 without departing from the scope of the invention. In another embodiment, system 100 can be part of a HUD computer.

EVS 160 as shown in FIG. 1, can include sensor element 140 which may include multiple sensing elements 106, 108 and 112. In one embodiment, sensing units 106, 108 and 112 may each be a different type of video camera such as a visible camera, a short wave infrared camera and a long wave infrared camera. Sensor element 140 may also include only a single camera or more than three cameras. An infrared camera 106, 108 or 112 may detect non-visible, near-infrared radiation such as that emitted by many runway and landing lights. Sensor element 140 may also include millimeter wave radiometry, millimeter wave radar and low light level image intensifying image sensing, for example. Sensor element 140 may include any type of sensing units that detect an aspect of an environment. In one exemplary embodiment, sensing unit 140 is mounted on an aircraft to detect forward-looking external scene topography such as natural or manmade features of a place or region to show their relative positions and elevation with respect to the aircraft. Accordingly, sensor element 140 can capture data representative of the actual scene in front of an aircraft.

Once image data is captured at sensor element 140, the signal or signals 134 are sent to formatting element 114. Formatting element 114 may detect various aspects of each video signal so that if more than one signal is detected at element 140, various elements from each video signal can be combined at EVS fusion stage 116 to produce an enhanced vision video signal 132. For example, formatting element 114 may perform segmentation, edge detection, pixel intensity detection, or any other method of image analysis to detect elements to be combined at EVS fusion stage 116. For example, EVS fusion stage 116 may be configured to detect only objects detected in from sensors 106, 108 and 112 that surpass a predetermined pixel intensity threshold while discarding other portions. Formatting element 114 may extract correspondent segments of data from each video signal and merge various segments into a single video frame so that there is no overlap of image data at any one location within the merged frame. For example, a final merged video frame in signal 132 may comprise a runway detected from sensor 106, runway lights detected from sensor 108 and a sky portion from sensor 112 with all remaining image data from one of the three sensors.

Figure 4:
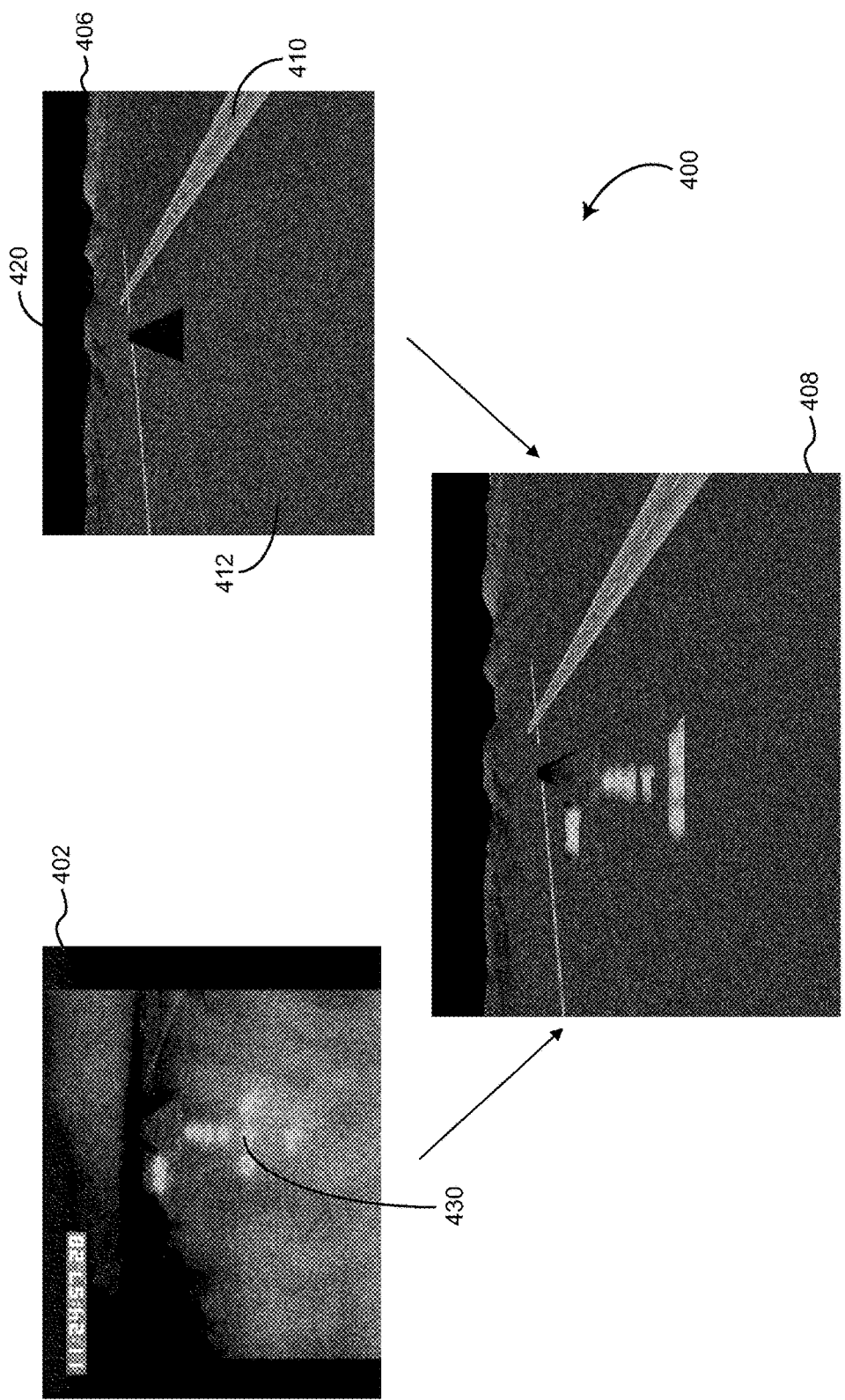
FIG. 4 is a block diagram of exemplary SVS data, EVS data and merged data.

SVS 162 is comprised in part of terrain database 102 and processor 104 according to one exemplary embodiment. Database 102 may be a terrain database to create a three-dimensional perspective of the scene in front of the aircraft on a two-dimensional display unit 110. One example of a frame 406 of is the three dimensional scene rendered by processor 104 as shown in FIG. 4. Database 102 could employ topographical colors similar to those depicted on standard aeronautical charts. Furthermore, database 102 is capable of detecting segments of image data corresponding to various objects in the computer generated image such as runways 410, terrain 412 and sky 420. Processor 104 can also use chroma keying to render various frame segments at step 204 of FIG. 2, such as segment 420 corresponding to a sky. According to one exemplary embodiment, sky segment 420 will have a common pixel value such as a common pixel color. The chroma keying process can also ensure that each designated segment is associated with a separate single color so that segment 420 is associated with a first color, segment 410 is associated with a second color and segment 412 is associated with a third color, or example.

The processor 104 may also receive aircraft position data 170 from an aircraft navigation system, for example, as input. Navigation systems can include any system that provides navigation data. For example, a typical navigation system in an aircraft is comprised of numerous sub-systems known to those skilled in the art. Sub-systems which provide aircraft position data could include, but are not limited to, an inertial guidance system, a global navigation satellite system, and a flight management computing system. Based on the aircraft position data, the processor 104 may retrieve or acquire corresponding terrain image data from the terrain database 102 and prepare the terrain image data for subsequent processing by the terrain rendering processor 104 as discussed herein.

According to one embodiment, EVS video signal 132 comprises video frames temporally correspondent to video frames in SVS video signal 130 such that when signal 132 arrives at EVS processor 118 and SVS signal 130 arrives at SVS processor 120, frames from each video signal contains data depicting similar external topography, with frame from signal 132 depicting a actual external topography and the frame from signal 130 depicting its computer generated counterpart. For example, in FIG. 4, EVS frame 402 may arrive at EVS processor 118 at a time substantially similar to the time frame 406 arrives at arrives at SVS processor 120. Once video signals 132 and 130 arrive at processors 118 and 120 respectively, process 200 shown in FIG. 2 may be executed by video merging processor 122 by executing instructions contained in memory 124 in one embodiment.

Figure 2:
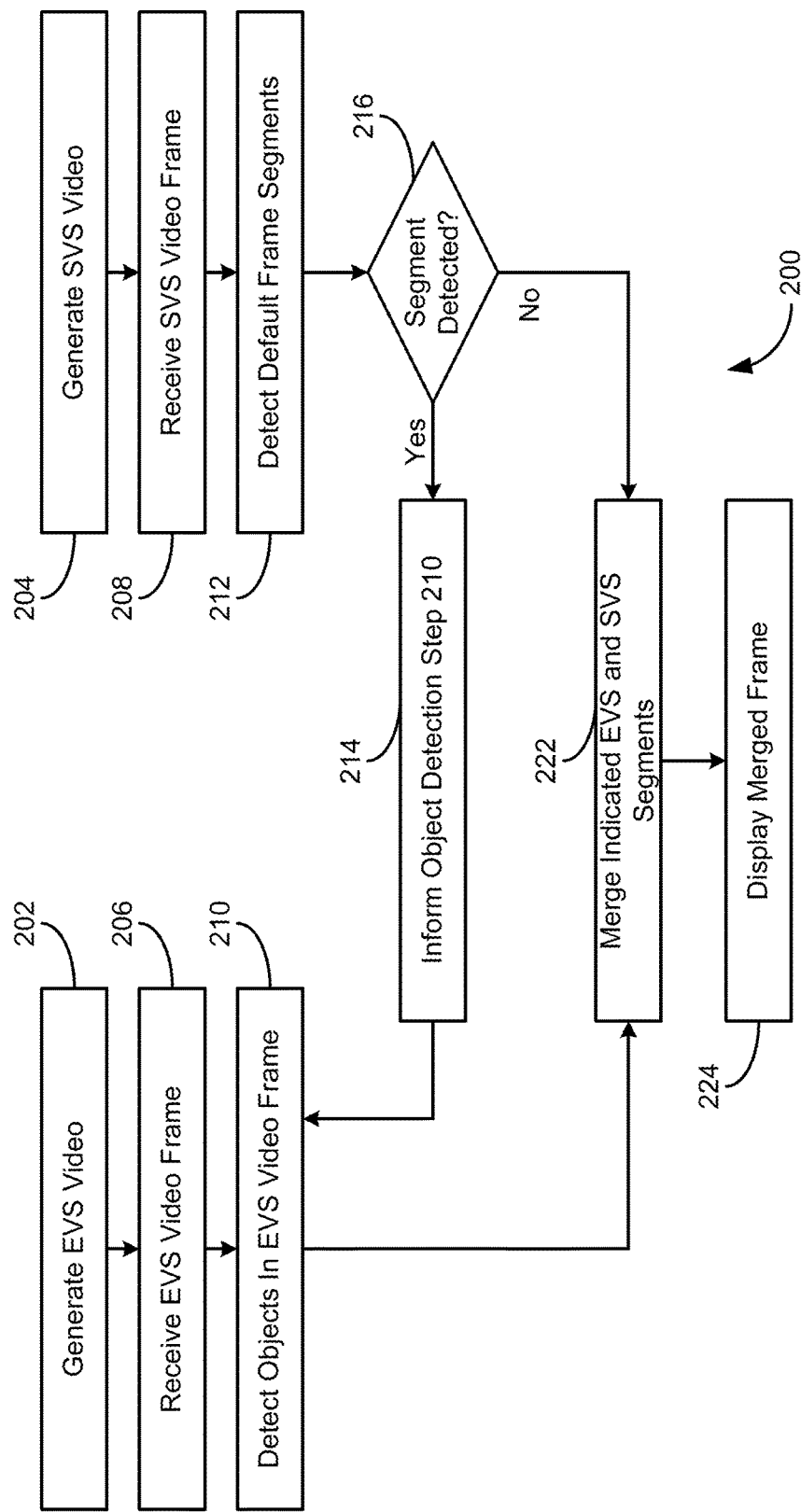
FIG. 2 is a flow chart of a method for merging EVS and SVS data according to one exemplary embodiment.
Figure 3:
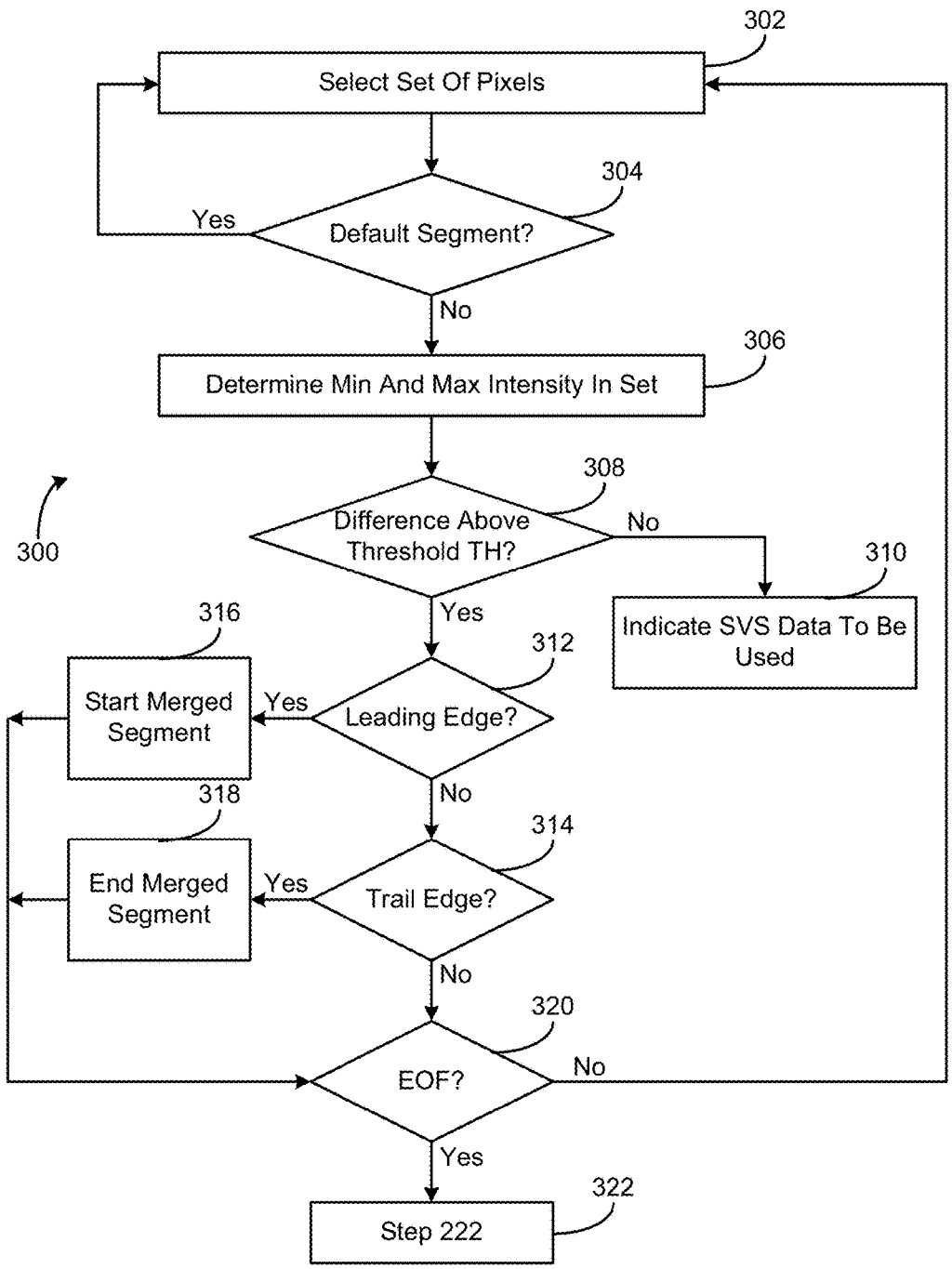
FIG. 3 is a flow chart of step 110 shown in FIG. 1 according to one exemplary embodiment.

Referring to FIG. 2, steps 202 and 204 describe the process of generating video signals 132 and 130 respectively as described above. Step 206 describes accepting EVS signal 132 at EVS processor 118 as shown in FIG. 1 while step 208 describes accepting SVS signal 130 at SVS processor 120. At step 210, process 200 detects objects in an EVS video frame according to process 300 shown in FIG. 3. The purpose of the process shown in FIG. 3 is to detect useful information such as highly visible objects in EVS video frames. For example, when system 100 is implemented in an aircraft, useful information may include runway lights 430. Process 300 may use an edge detection algorithm to find useful information contained in an EVS frame. Edge detection may be used to detect portions of a video frame where image brightness changes sharply, such as portions of EVS frame 402 that contains lights 430. According to one embodiment, all segments of EVS video frame data detected at step 210 will be implemented into the merged video frame at step 222. Furthermore, it may be the case that no objects are detected at step 210 so that the merged video frame created at step 222 only contains SVS video frame data.

In one embodiment, object detection step 210 is shown by process 300 in FIG. 3. Each frame of EVS data may be made up of data such as pixels arranged in a matrix or grid type format with columns and rows. At step 302 of process 300, a set of pixels are selected from an EVS video frame. The set of selected pixels comprise a one dimensional row of pixels according to one exemplary embodiment. The number of pixels in the row that are selected at a time can comprise any number of pixels in a given row. Furthermore, the set of pixels selected at step 302 are not limited to pixels in a single row. The set of selected pixels may comprise row and column of pixels centered at a particular pixel. The set of selected pixels may also be a two dimensional square of pixels or any other predetermined or adjustable number and arrangement of selected pixels.

Once a set of pixels are selected, step 304 determines if the selected pixels are part of a default segment associated with a corresponding SVS video frame. According to one embodiment, object detection algorithm 300 does not perform edge detection on pixels associated with default segments. Step 304 may check a flag or other indicator sent at step 212 and communicated at step 214 in FIG. 2. If a default segment is indicated, a new set of pixels are selected at step 302. If no default segment is indicated for the selected set of pixels, then the set of pixels such as a consecutive row of pixels, are scanned for a minimum and maximum pixel intensity value at step 306. Once the minimum and maximum pixel intensities are determined step 306 also determines the difference between the minimum and maximum value. This pixel intensity difference is then compared to a predetermined threshold value at step 308. If the difference is greater than the predetermined threshold, an object has been detected.

Figure 5A:
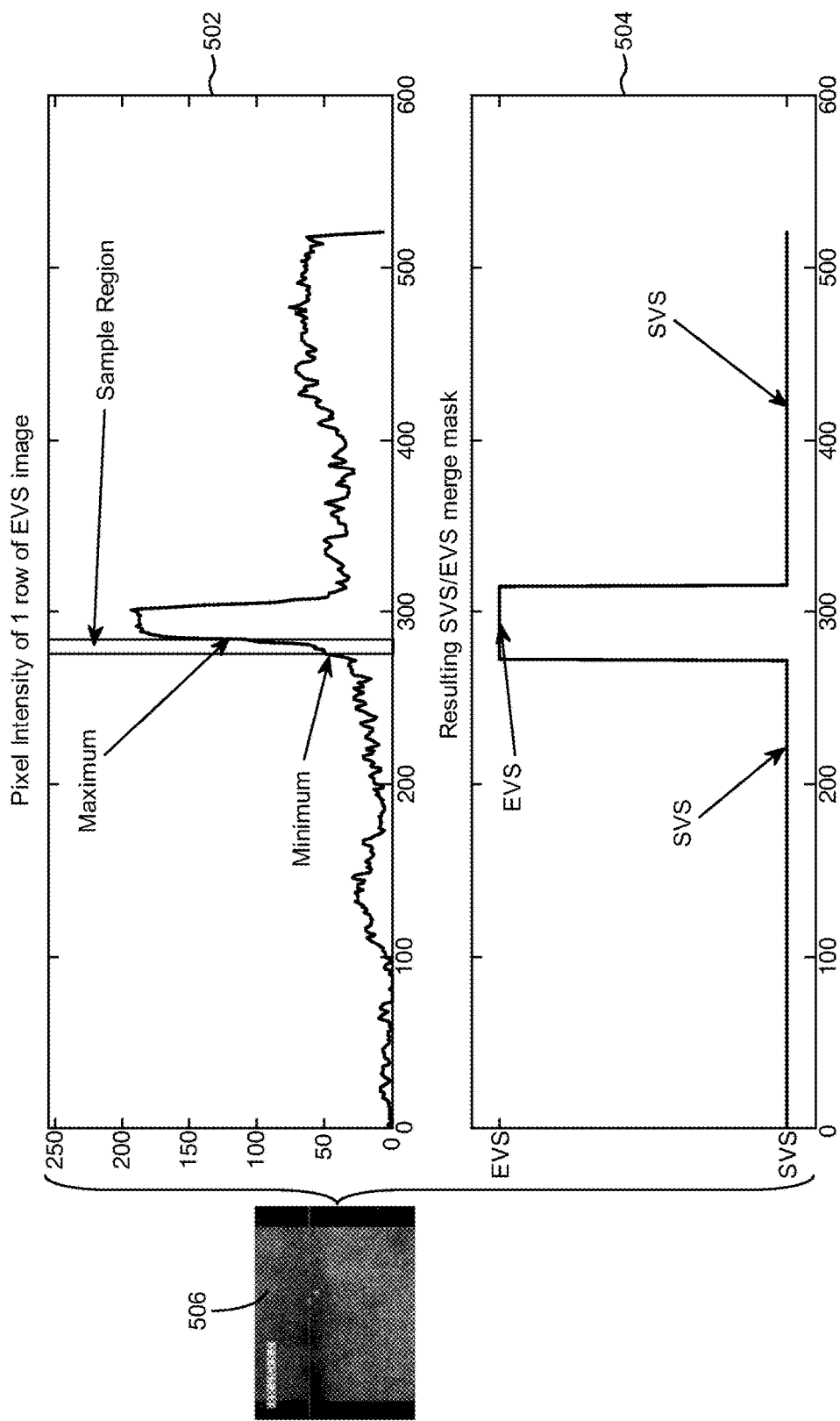
FIG. 5A is a chart depicting an aspect of object detection of EVS data in an EVS video frame according to one exemplary embodiment.
Figure 5B:
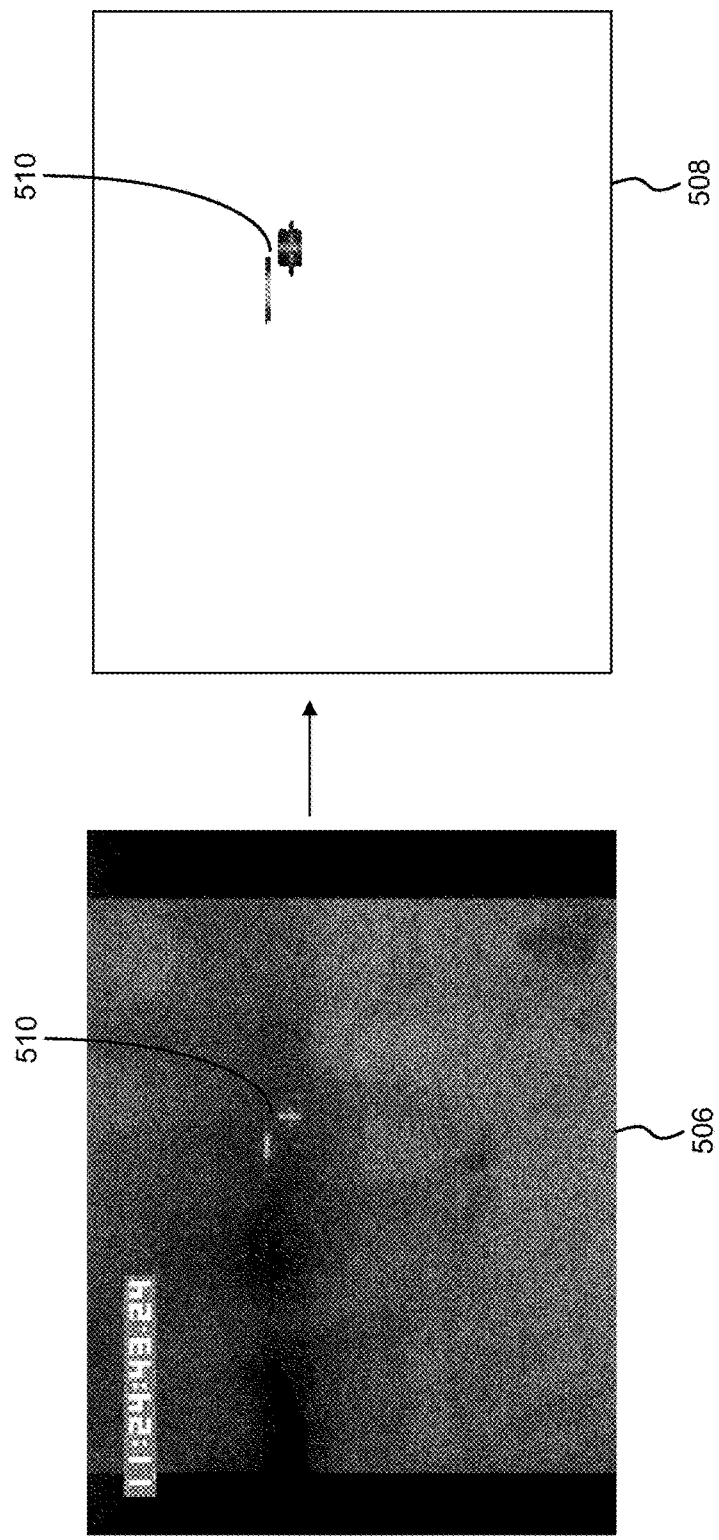
FIG. 5B shows a depiction of a video frame before object detection and a detected object from the same video frame according to one exemplary embodiment.

For example, FIG. 5A shows a chart 502 of data depicting pixel intensity on the y axis for a series of pixels on the x axis from frame 506. Referring to FIG. 5B, scanning each row of frame 506 left to right prior the "sample region" results in pixel intensities below 50 as seen on chart 502. However, once the row of pixels containing light 510 is scanned left to right at the vertical lines labeled "sample region," the pixel intensity spikes from approximately an intensity of 50 to an approximate intensity of 125 leading to a pixel intensity difference value of approximately 75, which in this embodiment is greater than the predetermined threshold at step 308. As shown in chart 504, once an object has been detected, such as object 510, step 312 indicates flags that EVS data to as data to be used in the merged frame created at step 222. Here, because the minimum pixel intensity in the set of pixels came before the maximum intensity in a left to right scan, the sample region indicated in chart 502 will be indicated as the leading edge of the detected object at step 312. If the minimum intensity comes after the maximum intensity in a left to right scan, the detected object will be indicated as a trailing edge at step 314.

According to one embodiment, once a leading edge is indicated at step 312, all pixels following the leading edge are flagged as EVS content to be included in merged frame until a trail edge is indicated at step 314. This embodiment is exemplified by chart 504 in FIG. 5A. When a leading edge is detected in the sample region in chart 502, an object flag may be set to indicate EVS data to be included in the merged frame. This object flag corresponds to the leading edge of the data indicated as EVS in chart 504. Furthermore, once a trailing edge is detected at approximately 310 on the x axis, that same object flag may be cleared to indicate the end of the EVS data to be included in the merged frame. Once the object flag is cleared, this corresponds to the trailing edge of the data indicated as EVS in chart 504. The leading and trailing edge in chart 504 corresponds to the object detected 510 as shown in frame 508. In this embodiment, EVS data 510 will be merged with SVS data at step 222 and sent to display at step 224 as a frame in signal 126.

Once a particular set of pixels have been analyzed, step 320 will determine if all pixels in the frame have been analyzed. If they have not, a new set of pixels will be selected at step 302. According to one exemplary embodiment, ten consecutive pixels in a row are selected at a time. Once that set has been analyzed, the set of pixels is shifted over to the right by one pixel so that the new set of pixels selected at step 302 includes nine previously analyzed pixels and one new pixel. The process shown in FIG. 3 is only one exemplary embodiment of an edge detection process that could include many variations. For example, algorithm 300 could be altered automatically or manually by a user during a landing or other desired period to lower the threshold value at step 308 in order to increase the amount of EVS data collected and subsequently merged at step 222.

Because segments of pixels such as segment 510 in an EVS frame 506 can be identified by a position (x, y) corresponding to a spatial location with a row and column, step 222 can map data from both an EVS video frame and an SVS video frame onto a common merged frame so that the common merged frame includes pixel positions that include data that originates in an EVS video frame and data that originates in an SVS video frame. For example, the pixel data positions corresponding to object 510 can be sent to step 222 to indicate to processor 122 that the merged frame contained in video signal 126 should include EVS data should be included in the merged frame at those pixel positions rather than SVS data. According to one embodiment, the merged frame in video signal 126 by default includes all SVS data unless object detection data is indicated at step 210.

Referring again to FIG. 2, once the SVS video signal 130 comprising a series of SVS video frames is received at processor 120, process 200 may detect default frame segments. Default frame segments refer to any segment of video data corresponding to a particular video frame feature. For example, referring to FIG. 4, SVS frame 406 includes video frame features that include a sky segment 420, a runway segment 410 and a terrain segment 412. Because SVS data is computer generated, these segments may be flagged or otherwise indicated prior to step 212. In this case, step 212 is unnecessary and process 200 merely checks various flags or other indicator at step 216 to determine if certain data segments such as a runway 410 are present. Otherwise, step 212 may implement an object detection, color detection or other algorithm to determine if portions of frame 406 correspond to a sky, terrain or runway. For example, step 212 may detect the RGB or YUV format pixel color values in the SVS video frame. Step 212 may also use chroma-key values assigned to various segments of the SVS frame to detect default frame segments.

Detecting default frame segments at step 212 can be used to both reduce processing time dedicated to object detection at step 210 and also to indicate the pixel location of particular segments to be assigned to EVS data by default in the merged frame regardless of the object detection process. For example, referring to FIG. 2 and FIG. 4, if a default frame segment 410 corresponding to a runway is detected at step 212, this information can be relayed to object detection stage 210 by data link 128 and as shown by step 214 to alter the object detection algorithm to prevent the object detection algorithm from scanning pixel positions associated with the default frame segment 410. Doing so can reduce the amount of processing required to carry out object detection step 210.

Furthermore, as shown in EVS frame 402, EVS data associated with a runway may be important to a user but may not be bright enough to be detected at step 210. Accordingly, in one embodiment, process 200 forces EVS data such as EVS data corresponding to the runway in frame 402 to be included in merged frame 410 by default. Doing so will allow a user such as a pilot to see real time video of a runway as the aircraft approaches rather than a computer rendered SVS image of a runway 410 that does not include real world video data. Real time video of runway 420 allows a user such as a pilot to see obstacles that may be on the runway in merged frame 408, such as another plane or other object crossing the runway.

Figure 6:
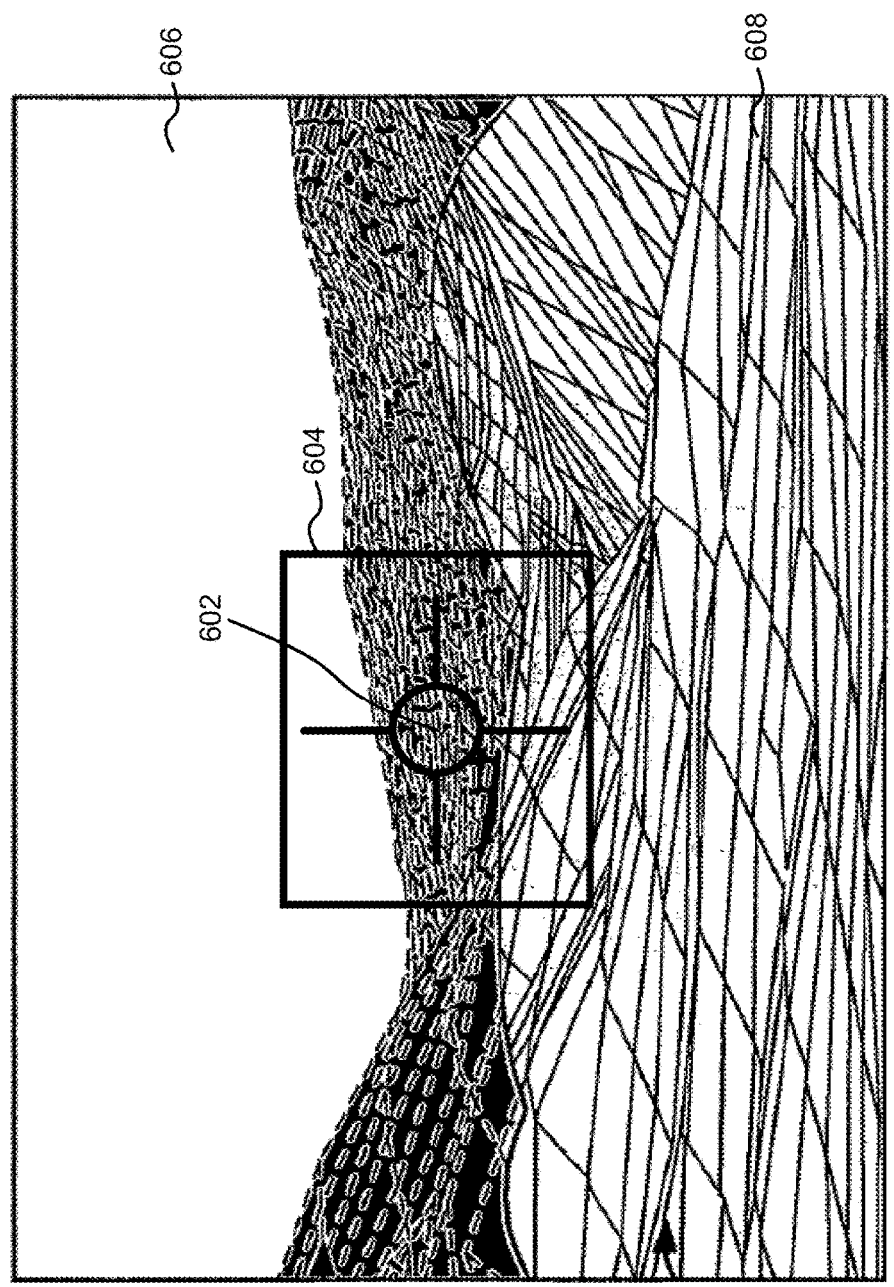
FIG. 6 is an exemplary block diagram of one embodiment of display content.

In a further embodiment, a source of data corresponding to a flight path symbol 602 may be superimposed on the merged video frame shown in FIG. 6. Because the process of superimposing indications or information such as flight path symbol 602 shown on display 110 are well-known to those skilled in the art, a discussion of the specific process is not necessary. It should be further noted that flight path symbol 602 has been intentionally omitted from FIG. 4 and FIG. 5 and is not indicative of the plurality of indications with which it may be configured; the omission of tactical information from the exemplar displays in FIG. 4 and FIG. 5 does not narrow the embodiments herein or create a limitation of them.

In the embodiment shown in FIG. 6, the location of flight path symbol 602 can be relayed to at least one of processors 118, 120 and 122 to indicate the position of the flight path symbol 602. In one embodiment, the video merging processor 122 can use EVS video frame data in a predetermined region such as square region 604 surrounding the flight path symbol 602. This embodiment provides the user such as a pilot a window of real-time actual representation of real-world terrain, obstacles, runways, runway obstructions, surrounding the flight path symbol 602 in window 604. Furthermore, in this embodiment shown in FIG. 6, SVS image terrain layer 608 and sky layer 606 surround EVS data window 604 and provides surrounding terrain awareness regardless of weather conditions. In avionics, the terrain layer is not as critical for the awareness of real-time real world activity, but is useful in the perception of the aircraft's approach progress and awareness of terrain constraints for a potential missed approach and go-around.

Once segments of EVS and SVS video frames to be merged have been indicated at steps 210 and 212, the video frames are merged at step 222 to create a merged video frame such as frame 408 or the frame shown in FIG. 6, for example at processor 122. Processor 122 determines the position where each video segment would appears on display unit 110; for example, the determination of position could include a scaling computation to convert pixel position indicators for both EVS and SVS data to the "screen space" of display 110. Once the conversion processor completes the frame merge, the merged video signal 126 containing the merged frame is sent to a display 126. Display 110 may be any type of display including but not limited to an LCD display and may be implemented in a HMD, HDD or HUD system.

One benefit of merging EVS and SVS frame segments to be displayed simultaneously without an overlap of images is depicted in FIG. 4. As seen in frame 408, the object detection performed by process 300 has extracted runway lights 430 while eliminating distracting environmental conditions. Furthermore, default frame segment 410 has been included in merged frame 408 so that any objects that may impede runway 410 would still be visible.

While the detailed drawings, specific examples, and particular formulations given described preferred and exemplary embodiments, they serve the purpose of illustration only. For example, in FIG. 3, a flow chart of a method for merging EVS and SVS data according to one exemplary embodiment is depicted. Although steps 302 and 304 are shown as processes running in parallel in the exemplary embodiment depicted in FIG. 1, respective processes 302 and 304 may also carried out alternating in series and the various steps may be carried out in varying orders.

Additionally, each processor disclosed in the various Figures such as processors 116, 104, 118, 122 and 120 shown in FIG. 1, for example, may be any electronic data processing unit which executes software or source code stored, permanently or temporarily, in a digital memory storage device or computer-readable media including, but not limited to, FPGA, RAM, ROM, CD, DVD, hard disk drive, diskette, solid-state memory, PCMCIA or PC Card, secure digital cards, and compact flash cards or other non-transitory computer medium. A common example of an electronic data processing unit is a microprocessor digital signal processor, video processor or other computing device, however, for the embodiments herein, the term processor is not limited to the microprocessor, digital signal processor or video processor and its meaning is not intended to be construed narrowly. In addition, a processor or digital signal processor could also consist of more than one electronic data processing units.

Furthermore, the embodiments disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A method of providing merged video content from two independent video sources via a processor located onboard an aircraft, comprising:
   receiving an enhanced frame associated with an enhanced vision video from an enhanced vision system;
   receiving a synthetic frame associated with a synthetic vision video from a synthetic vision system;
   analyzing the enhanced frame to detect objects according to a first algorithm by receiving a set of pixels from the enhanced frame and determining whether the set of pixels correspond to a detected default frame segment of the synthetic frame, wherein the first algorithm is an object detection algorithm based upon an intensity difference threshold, the intensity difference threshold based on a minimum and a maximum intensity detected in the enhanced frame, and wherein analyzing the enhanced frame comprises altering the object detection algorithm to prevent the object detection algorithm from analyzing the set of pixels in response to the set of pixels corresponding with the detected default frame segment of the synthetic frame, and wherein the object detection algorithm is further altered to lower the intensity difference threshold to increase the presence of detected objects in the enhanced frame after the aircraft has taken off and before the aircraft has landed in response to the aircraft entering a landing phase of flight;
   analyzing the synthetic frame to provide the at least one detected default frame segment;
   selecting the detected objects from the enhanced frame and an enhanced frame segment from the enhanced frame corresponding to the detected default frame segment from the synthetic frame;
   providing the selected detected objects and the enhanced frame segment to a merged frame, wherein the merged frame comprises the detected objects, the enhanced frame segment, and the synthetic frame without the detected default segment;
   displaying the merged frame on a display, wherein the merged frame is provided as a single image representing the detected objects, the enhanced frame segment and the synthetic frame without the detected default segment correlated in the single image by position.

2. The method of claim 1, wherein the detected objects in the enhanced frame are analyzed by using an edge-detection method to analyze pixels in the detected object.

3. The method of claim 1, wherein a chroma keying technique is used in generating the synthetic frame and further wherein chroma key values are used to determine the content of segments in the merged frame.

4. The method of claim 1, wherein the merged frame includes segments from the enhanced frame in a continuous and predetermined region around the location of a flight path symbol.

5. The method of claim 2, wherein the edge detection method does not analyze segments of the enhanced frame that correspond to the detected default frame segments.

6. The method of claim 2, wherein the edge-detection method comprises:
   determining if a minimum pixel intensity in the set of pixel values is before a maximum pixel intensity in the set of pixel values from left to right to determine a leading edge.

7. The method of claim 6, wherein the set of pixels are consecutive pixels in contained in a row and after the edge detection method has been performed on a selected set of pixels, a new set of pixels are selected by shifting over to the next pixel according to a predetermined shift order.

8. The method of claim 7, further comprising:
   determining if the maximum pixel intensity is before the minimum pixel intensity from left to right to determine a trailing edge;
   setting a flag at a leading edge of the pixels of the detected object; and
   clearing the flag at a trailing edge of the pixels of the detected object.

9. The method of claim 1, wherein the enhanced vision video is video of external scene topography collected by at least one imaging sensor including an infrared camera.

10. The method of claim 1, wherein the synthetic vision video is a computer generated video derived from a database stored in memory wherein the database includes information associated with terrain and runways.

11. An apparatus for providing merged video content from two independent video sources, the apparatus comprising:
   an enhanced vision system including at least a first sensor configured to detect enhanced vision video; and
   a synthetic vision system including a graphics generator configured to generate a computer generated synthetic vision video, wherein at least one processing device onboard an aircraft is configured to:
      receive enhanced vision video from the enhanced vision system and synthetic vision video from the synthetic vision system;
      select an enhanced frame in the enhanced vision video;
      select a synthetic frame from the synthetic vision video corresponding to the selected enhanced frame;

detect the presence of at least one default frame segment in the synthetic frame;

detect the presence of detected objects in the enhanced frame using an object detection algorithm, wherein the object detection algorithm prevents the object detection algorithm from analyzing a set of pixels from the enhanced frame in response to determining that the set of pixels correspond with the at least one detected default frame segment in the synthetic frame, and wherein the object detection algorithm is configured to automatically alter a parameter during a landing phase of flight or a takeoff phase of flight of the aircraft to cause the presence of detected objects in the enhanced frame to increase; and merge the enhanced frame with the synthetic frame to provide a merged frame comparing the detected objects in the enhanced frame and an enhanced frame segment from the enhanced frame corresponding to the detected default frame segment from the synthetic frame, wherein the merged frame represents a single image representing the detected objects, the enhanced frame segment and the synthetic frame without the detected default segment in a merged position correlated format.

12. The apparatus of claim 11, wherein the detected objects in the enhanced frame are analyzed using an edge-detection method to analyze pixels in the enhanced frame, and wherein the detected default frame segment is detected using a flag in a database.

13. The apparatus of claim 11, wherein a chroma keying technique is used in generating the synthetic frame and further wherein chroma key values are used to determine the content of default frame segments in the merged frame.

14. The apparatus of claim 11, wherein the merged frame includes segments from the enhanced frame in a predetermined region around the location of a flight path symbol.

15. The apparatus of claim 12, wherein the detected objects are detected using an edge detection method and the edge detection method does not analyze portions of the enhanced frame that correspond to the detected default frame segment.

16. The apparatus of claim 15, wherein the edge-detection method comprises:
determining a leading edge presence if a maximum pixel intensity is after a minimum pixel intensity in a left to right orientation.

17. The apparatus of claim 16, wherein the set of pixels are consecutive pixels contained in a row and after the edge detection method has been performed on a selected set of pixels, a new set of pixels are selected by shifting over to the next pixel according to a predetermined shift order.

18. The apparatus of claim 17, further comprising:
setting a flag at a leading edge of the pixels of the detected object; and
clearing the flag at a trailing edge of the pixels of the detected object.

19. The apparatus of claim 11, wherein the enhanced vision video is video of external scene topography collected by at least one imaging sensor including an infrared camera and the synthetic vision video is a computer generated video derived from a database stored in memory wherein the database includes information associated with terrain and runways.

20. An apparatus for providing a video merged from an enhanced vision system including at least a first forward looking sensor mounted externally to an aircraft configured to detect enhanced vision video, and a synthetic vision system including a graphics generator configured to generate a computer generated synthetic vision video, the apparatus comprising:
a processing device configured to:
receive enhanced vision video from the enhanced vision system and synthetic vision video from the synthetic vision system;
select an enhanced frame in the enhanced vision video;
select a synthetic frame from the synthetic vision video corresponding to the selected enhanced frame;
detect the presence of at least one default frame segment in the synthetic frame;
detect the presence of detected objects in the enhanced frame using an object detection algorithm, wherein the object detection algorithm is based on an intensity difference threshold, the intensity difference threshold based on a minimum and a maximum intensity detected in the enhanced frame, wherein the object detection algorithm is altered to prevent the object detection algorithm from analyzing a set of pixels from the enhanced frame in response to the set of pixels corresponding with the at least one detected default frame segment in the synthetic frame, and wherein the object detection algorithm is further altered to lower the intensity difference threshold during a landing phase of flight of an aircraft to increase the presence of detected objects in the enhanced frame; and
merge the enhanced frame with the synthetic frame to provide a merged frame comprising the detected objects in the enhanced frame and an enhanced frame segment corresponding to the default frame segment detected in the synthetic frame, wherein the merged frame represents a single image representing the detected objects, the enhanced frame segment and the synthetic frame without the detected default segment in a merged position correlated format.

* * * * *